Dec. 11, 1923.

W. A. COLGATE 1,477,429

BEARING DEVICE FOR CIRCLE SWINGS

Filed Oct. 3, 1921   2 Sheets-Sheet 1

Inventor
W. A. Colgate.
By E. E. Vrooman & Co.,
Attorneys.

Dec. 11, 1923.
W. A. COLGATE
BEARING DEVICE FOR CIRCLE SWINGS
Filed Oct. 3, 1921
1,477,429
2 Sheets-Sheet 2
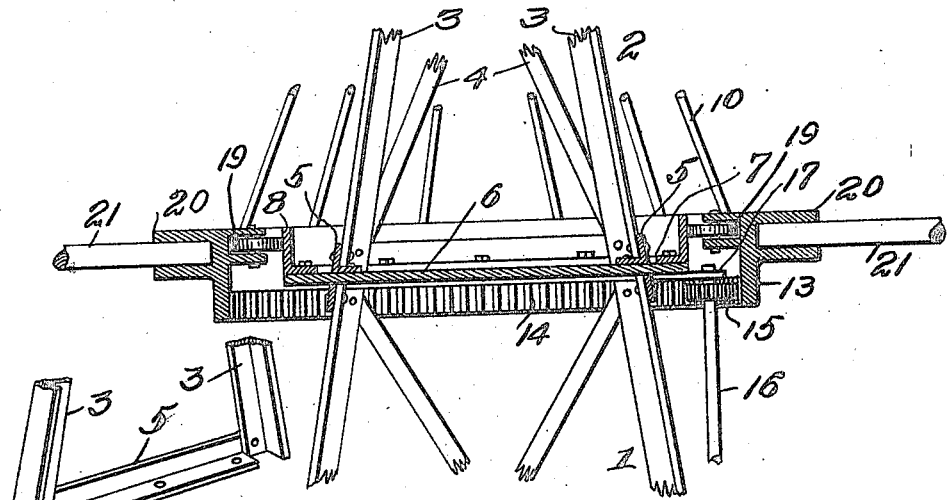
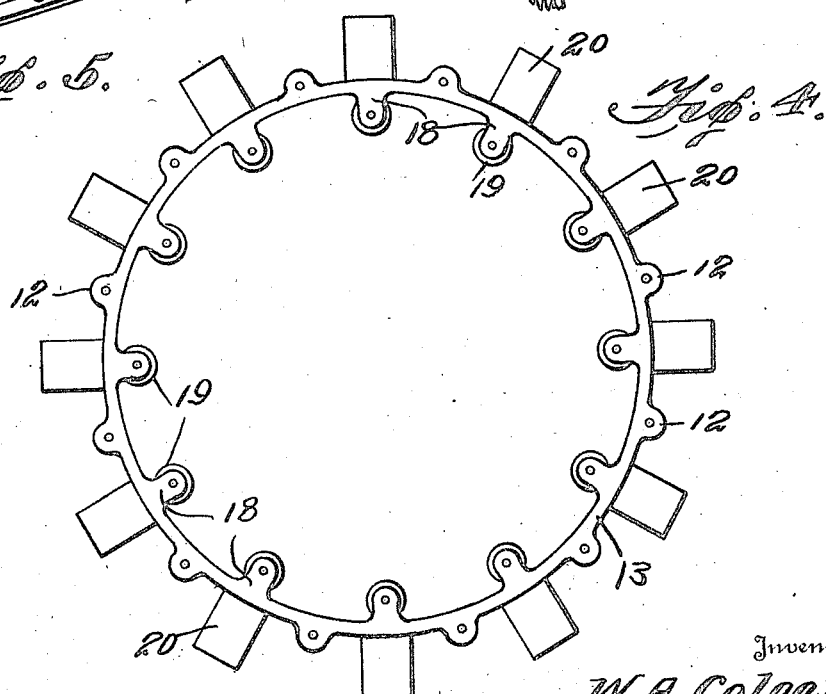
Inventor
W. A. Colgate
By
his Attorneys Patented Dec. 11, 1923.

1,477,429

UNITED STATES PATENT OFFICE.

WILLIAM ADAM COLGATE, OF GARDEN CITY, NEW YORK.

BEARING DEVICE FOR CIRCLE SWINGS.

Original application filed August 26, 1920, Serial No. 406,066. Divided and this application filed October 3, 1921. Serial No. 505,148.

*To all whom it may concern:*

Be it known that I, WILLIAM A. COLGATE, a citizen of the United States, residing at Garden City, in the county of Nassau and State of New York, have invented certain new and useful Improvements in a Bearing Device for Circ'e Swings, of which the following is a specification, reference being had therein to the accompanying drawings.

This invention relates to a bearing device for circle swings, and is a divisional application to my original application, Serial No. 406,066, a truck-supported knock-down circle swing.

The object of the invention is the production of a simple and efficient bearing device comprising the top of the tower of my circle swing.

With this and other objects in view, my invention comprises certain novel combinations, constructions and arrangements of parts as will be hereinafter described, illustrated in the accompanying drawings, and more particularly pointed out in the appended claim.

In the drawings:

Figure 2 is a fragmentary, transverse, sectional view of the tower, showing my bearing device.

Figure 4 is a top, plan view of the outer or gear ring.

Figure 5 is a fragmentary, perspective view of the inner portion of my bearing device.

Figure 1:
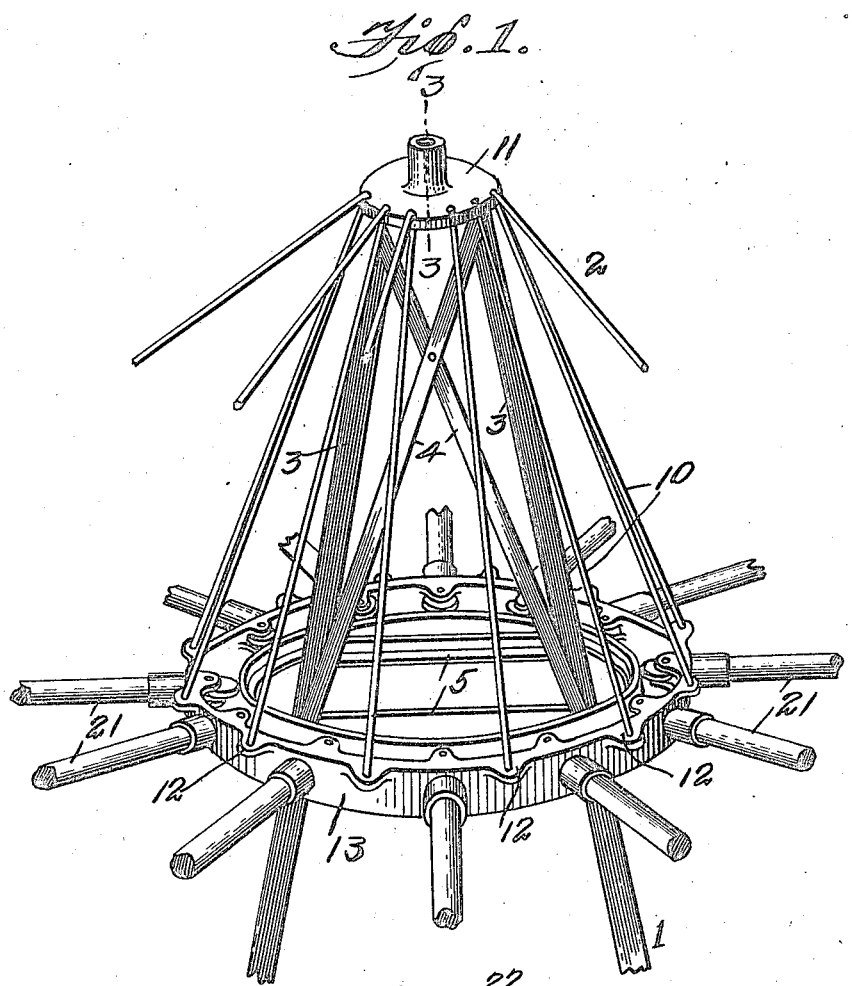
Figure 1 is a fragmentary, perspective view of the tower of a circle swing, showing particularly my improved bearing device or top structure of the swing.

Referring to the drawings by numerals, 1 designates one of the intermediary sections of the tower, supporting the top section 2 which includes my bearing device. The top section 2 comprises angle bars 3 and cross bars 4. The angle bars 3 are fastened at their lower ends to the horizontal, angle bars 5, and these bars 5 are fastened to cross pieces 6, which cross pieces 6 rest upon the top of section 1, supporting the top section or structure 2 with the bearing device upon the lower or intermediary sections of the tower.

The outer ends of the cross pieces 6 are attached to the horizontal, annular flange 7 of the inner bearing ring 8; attached to the bars 3 and 4 (Fig. 3) is a bearing plate 9. The outer portion of the top section includes rods 10 connected at their upper ends to cap-plate 11 and connected at their lower ends to lugs 12, which lugs extend outwardly from and are integral with the outer or gear ring 13. On the inner face of ring 13 and formed near its bottom are gear teeth 14, and meshing with teeth 14 is cog 15, which cog is fixedly secured to driving shaft 16; the upper end of shaft 16 is journaled in plate 17, which plate 17 is fastened to one of the cross pieces 6.

Horizontal brackets 18 are formed on the (Fig. 4) inner face of ring 13 and in each pair of brackets 18 are journaled bearing rollers 19, which rollers 19 travel over the outer face of inner ring 8. Horizontally extending, integral sockets 20 are formed upon the outer face of outer ring 13, in which sockets are detachably secured the arms 21; it is to be understood that, by reason of these arms 21 being detachably mounted in the sockets 20, the arms can be easily detached when desired.

Figure 3:
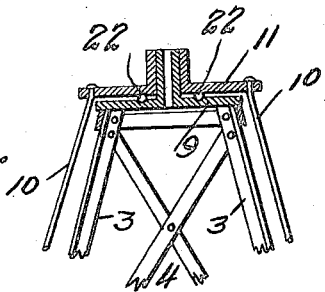
Figure 3 is a sectional view, taken on line 3—3, Fig. 1.

Between plate 9 and cap-plate 11 are ball bearings 22 (Fig. 3).

It is to be understood that the inner ring 8 with the bars 3 and 4 and plate 9 remain stationary upon the under or next section 1 of the tower whereas, when shaft 16 is rotated, the outer ring 13 will be revolved, resulting in the outer portion 2 of the top or upper section of the tower being rotated, resulting in the turning of the arms 21 upon the circle swing.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

In a device of the character described, a supporting frame, a bearing ring positioned about said support intermediate the height thereof, a bearing disk at the upper end of said support, a carrier disk rotating upon said bearing disk, a carrier ring positioned about said bearing ring and having inner gear teeth, ears extending outwardly from said carrier ring, hanger rods connected with said ears and said carrier disk and suspending said carrier ring, bar carrying sockets extending outwardly from said carrier ring in staggered relation to said ears, bearing brackets extending inwardly from said carrier ring above said gear teeth, rollers rotatably carried by said brackets and engaging the outer face of said bearing ring, a vertically disposed drive shaft, and a pinion carried by said drive shaft and meshing with the gear teeth for imparting rotary movement to said carrier ring.

In testimony whereof I hereunto affix my signature.

WILLIAM ADAM COLGATE.